United States Patent
Le Gros et al.

(10) Patent No.: US 10,033,977 B2
(45) Date of Patent: Jul. 24, 2018

(54) METHOD FOR REDUCING SPECKLE EFFECT

(71) Applicant: INTEL CORPORATION, Santa Clara, CA (US)

(72) Inventors: Christophe Le Gros, Renens (CH); Nicolas Abele, Lausanne (CH)

(73) Assignee: INTEL CORPORATION, Santa Clara, CA (US)

( * ) Notice: Subject to any disclaimer, the term of this patent is extended or adjusted under 35 U.S.C. 154(b) by 144 days.

(21) Appl. No.: 14/902,862

(22) PCT Filed: Jul. 22, 2013

(86) PCT No.: PCT/EP2013/065423
§ 371 (c)(1),
(2) Date: Jan. 5, 2016

(87) PCT Pub. No.: WO2015/010715
PCT Pub. Date: Jan. 29, 2015

(65) Prior Publication Data
US 2016/0156886 A1 Jun. 2, 2016

(51) Int. Cl.
*G03B 21/20* (2006.01)
*G03B 21/28* (2006.01)
(Continued)

(52) U.S. Cl.
CPC ....... *H04N 9/3155* (2013.01); *G02B 26/0833* (2013.01); *G02B 27/14* (2013.01);
(Continued)

(58) Field of Classification Search
CPC ............ G03B 21/2033; G03B 21/2053; G03B 21/147; G03B 21/005; G03B 21/14; G03B 21/2066; G03B 21/208; G03B 21/28; H04N 9/3129; H04N 9/3161; H04N 9/3155; H04N 9/3138; H04N 9/3135; H04N 9/3188
See application file for complete search history.

(56) References Cited

U.S. PATENT DOCUMENTS

2009/0067459 A1 3/2009 Mizuuchi et al.
2012/0133902 A1 5/2012 Nishioka et al.
(Continued)

FOREIGN PATENT DOCUMENTS

EP 2458876 5/2012
JP 2010-26483 8/2011
(Continued)

OTHER PUBLICATIONS

Lee; KR10-201000003594; Jan. 11, 2010; Machine translation in English.*
(Continued)

*Primary Examiner* — Ryan Howard

(57) ABSTRACT

According to the present invention there is provided a method of reducing speckle in a primary light spot which is projected onto a surface by a projection device which comprises a laser, wherein a primary light spot is defined by two or more secondary light spots, the method comprising the steps of (a) consecutively providing the laser with "n" different input currents so that the laser consecutively outputs "n" different light beams, wherein each one of the "n" different light beams defines a secondary light spot on the surface, wherein "n" is an integer value greater than one; and (b) superposing the secondary light spots. There is further provided a corresponding method of projecting a pixel.

24 Claims, 9 Drawing Sheets

(51) Int. Cl.
*H04N 9/31* (2006.01)
*G02B 27/48* (2006.01)
*G02B 26/08* (2006.01)
*G02B 27/14* (2006.01)
*G02B 26/10* (2006.01)

(52) U.S. Cl.
CPC .......... *G02B 27/48* (2013.01); *H04N 9/3129* (2013.01); *H04N 9/3161* (2013.01); *G02B 26/105* (2013.01); *G03B 21/2033* (2013.01); *G03B 21/28* (2013.01)

(56) References Cited

U.S. PATENT DOCUMENTS

| | | | |
|---|---|---|---|
| 2012/0134693 | A1 | 5/2012 | Hoshi et al. |
| 2013/0222774 | A1* | 8/2013 | Chikaoka ............... G02B 27/48 |
| | | | 353/85 |

FOREIGN PATENT DOCUMENTS

| | | |
|---|---|---|
| JP | 2012-208103 | 10/2012 |
| KR | 20100003594 | 1/2010 |
| WO | 20120070693 | 5/2012 |

OTHER PUBLICATIONS

International Search Report, dated Feb. 19, 2014, Application No. PCT/EP2013/065423, Filed Date: Feb. 26, 2014, pp. 3.
Office Action received for Japanese Patent Application No. 2016-528363, dated Jun. 9, 2017, 3 pages English translation.

* cited by examiner

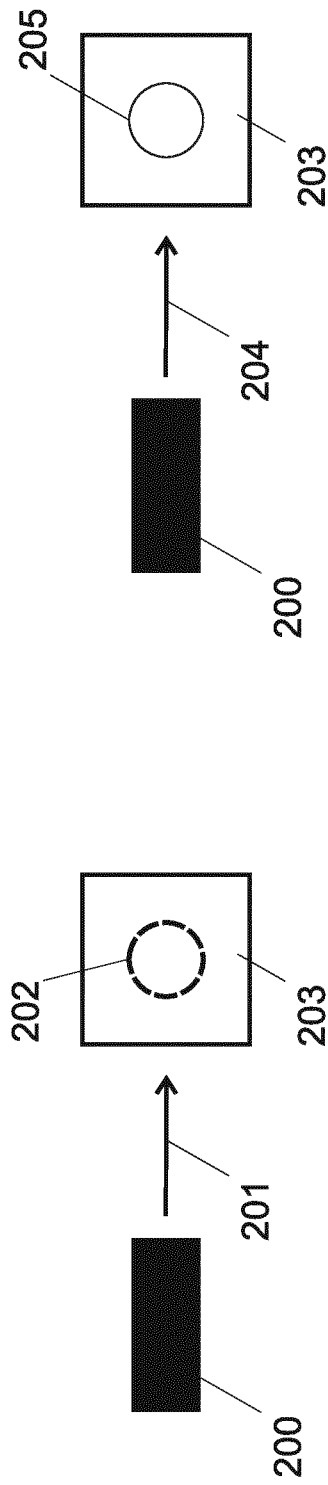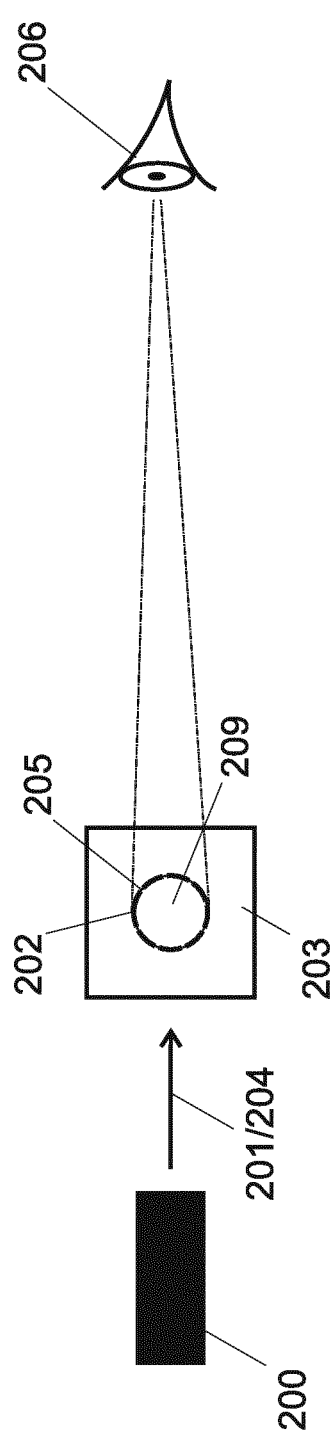

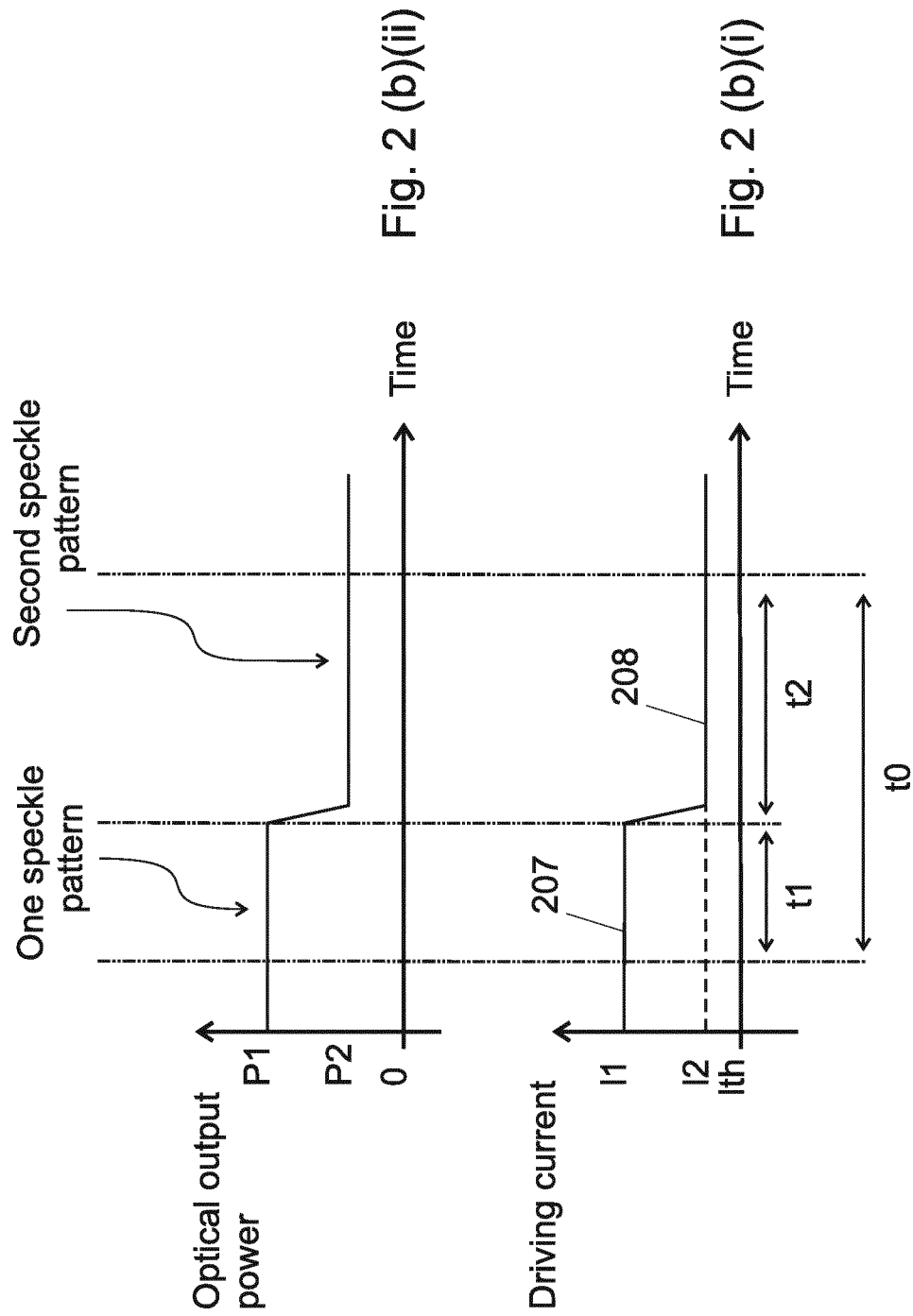

METHOD FOR REDUCING SPECKLE EFFECT

FIELD OF THE INVENTION

The present invention concerns a method for reducing speckle effect and in particular to a method of reducing speckle effect in a light spot which defines a pixel, which is projected by a projection device onto a surface. There is further provided a corresponding method of projecting a pixel.

DESCRIPTION OF RELATED ART

Speckle is a phenomenon created with laser light sources, due to the fact that laser light is coherent. Parallels and synchronized wavefronts simultaneously hit the projection surface. When the light hits the surface, it creates constructive and destructive interference. Speckle is a particular problem for projection devices as it deteriorates the quality of a projected image.

Several techniques are used in order to remove or reduce speckle when projecting images. The most common is to use more than one beam spot to define each pixel whereby each of the position of each of the beam spots are off-set from one another so that none of the beam spots are aligned to directly overlay one another. The off-set positioning of the beam spots will cause an averaging of the speckle over the whole pixel so that the speckle in the pixel will be reduced. Disadvantageously this method requires that the positions of each of the beam spots which define a pixel to be different. Furthermore, for high definition projection the area of each of the pixels in a projected image are small and therefore the number of different positions which are available for the light spots which define a pixel is limited. The limited number positions means that the amount of speckle reduction which can be achieved is limited.

Another technique to reduce speckle when projecting images involves turning off the light source within the projection device for a period, when projecting each one of the pixels. In other words, when projecting a pixel of an image the light source in the projection device is turned on for a period and is then turned off; to project the next pixel of the image the light source in the projection device is turned on again. The turning on of the light source causes an oscillation in the optical output power which is output of the laser, which thus causes an oscillation in the optical output power which is output of the projection device. The oscillation in the optical output power which is output of the projection device causes a reduction in the speckle in each pixel. Disadvantageously, since the light source within the projection device is turned off when projecting each pixel less light is used to define each pixel so the pixels of the projected image are not well defined. Furthermore, it takes time to turn on and off the light source which increase the length of time required to project each pixel.

It is an aim of the present invention to obviate or mitigate at least some of the above mentioned disadvantages.

BRIEF SUMMARY OF THE INVENTION

According to the present invention there is provided a method of reducing speckle in a primary light spot which is projected onto a surface by a projection device which comprises a laser, wherein a primary light spot is defined by two or more secondary light spots, the method comprising the steps of, (a) consecutively providing the laser with "n" different input currents so that the laser consecutively outputs n different light beams, wherein each one of the "n" different light beams defines a secondary light spot on the surface, wherein "n" is an integer value greater than one; and (b) superposing the secondary light spots. For example the method may comprises comprising the steps of (a) providing the laser with a first input current so that the laser outputs a first light beam which defines a first secondary light spot on a surface; (b) providing the same laser with a second input current so that the laser outputs a second light beam which defines a second secondary light spot on the surface, wherein the first and second input currents are different so that the first and second light beams are different; and (c) superposing the first and second secondary light spots to define a single primary light spot on the surface Each of the "n" input currents may be higher than the threshold current of the laser.

Each of the "n" input currents may have a different amplitude.

Preferably the size of each of the secondary light spots are equal.

The step of superposing the secondary light spots may comprise directly overlaying the secondary light spots on one another so that they are aligned and overlapped.

Each one of the "n" different light beams are used to define a single secondary light spot each, on the surface so that the "n" different light beams define "n" different secondary light spots on the surface and wherein the step of superposing the secondary light spots comprises superposing the secondary light spots to define a single primary light spot.

The single primary light spot may define a pixel of an image.

The method may comprise repeating the steps (a) and (b) mentioned above a plurality of times to project a plurality of single primary light spots, wherein each of the single primary light spots defines a pixel of an image so that the plurality of single primary light spots cumulatively define an image.

The method may comprise the step of selecting a desired power of the primary light spot. The method may comprise the step of ensuring that the sum of the power of the secondary light spots which define a primary light spot, is equal to the desired primary light spot output power, according to the following equation:

$$(\text{"The time the primary light spot is defined on the surface"}) \times (\text{"The desired power of the primary light spot"}) = \text{SUM}(\text{"The power of a secondary light spot"} \times \text{"The time the secondary light spot is defined on the surface"})$$

Wherein the power of the primary light spot is the optical power (in Watts) of the primary light spot and the power of a secondary lights spot is the optical power (in Watts) of the secondary light spot and wherein "SUM" is the sum of all the secondary light spots which define the primary light spot with the desired power.

The total duration of time the "n" secondary light spots are defined on the surface is between 1 ns-1 s. The total duration of time the "n" secondary light spots are defined on the surface may be between 1 ns-10 ms. The total duration of time the "n" secondary light spots are defined on the surface may be between 10 ms-50 ms. The total duration of time the "n" secondary light spots are defined on the surface may be between 20 ms-33 ms. The integration time of a human eye is typically within the range 20 ms-33 ms; if the input current is changed within this period of time, the human eye will average the superposed beams, and speckle is reduced.

The duration of time between when the laser is provided with the first of the "n" input currents to when the laser is provided with the $n^{th}$ input current may be between 1 ns-1 s. The duration of time between when the laser is provided with the first of the "n" input currents to when the laser is provided with the $n^{th}$ input current may be between 10 ms-50 ms. The duration of time between when the laser is provided with the first of the "n" input currents to when the laser is provided with the $n^{th}$ input current may be between 20 ms-33 ms.

Each one of the "n" different light beams may be used to define "m" secondary light spots each, and the method may comprise the step of superposing the "m" secondary light spots from each of the "n" different beams to define "m" primary light spots, wherein "m" is an integer number greater than or equal to "2". For example, the method may comprise (a) consecutively providing the laser with "n" different input current so that the laser consecutively outputs "n" light beams, (b) using each of the "n" light beams to define a plurality of secondary light spots on a surface, so that "n" pluralities of secondary light spots are defined on the surface; and (c) superposing the "n" pluralities of secondary light spots on each other to define a plurality of primary light spots on the surface, wherein in "n" is an integer number greater or equal than "2". For example the method may comprise the steps of (a) providing the laser with a first input current so that the laser outputs a first light beam which defines a first plurality of secondary light spots on a surface; (b) providing the same laser with a second input current so that the laser outputs a second light beam which defines a second plurality of secondary light spots on the surface, wherein the first and second input currents are different so that the first and second light beams are different; (c) superposing the first plurality of secondary light spots on the second plurality of secondary light spots to define a plurality of single primary light spots on the surface.

The method may further comprise the step of reflecting each of the "n" different light beams using a Digital Micromirror Device (DMD), Liquid Crystal On Silicon (LCOS) or Thin Film Transistor (TFT) matrix so that each of the "n" different light beams define "m" secondary light spots each.

Each of the "m" primary light spots may define a pixel of an image.

The method may comprise the steps of, (a) projecting "p" frames, each of which comprise a plurality of secondary light spots, each of the plurality of secondary light spots being defined by a light beam which is output from the laser; (b) superposing the "p" frames; wherein input currents provided to the laser so that the laser outputs the light beams which define corresponding light spots in the "p" frames are different, wherein corresponding light spots are those light spots which superpose each other when the "p" frames are superposed, and wherein "p" is an integer number greater than one. For example the method may comprise the steps of (a) projecting a first frame which comprises a plurality of light spots each defined by a light beam which is output from the laser; (b) projecting a second frame which comprises a plurality of light spots each defined by a light beam which is output from the laser; (c) superposing the first and second frames to define an image; wherein the input currents provided to the laser so that the laser outputs the light beams which define the light spots which are comprised in the first frame are different to the input currents provided to the laser so that the laser outputs the light beams which define corresponding light spots which are comprised in the second frame, wherein corresponding light spots are those light spots which superpose each other when the first and second frames are superposed.

Wherein the difference between input currents provided to the laser so that the laser outputs the light beams which define light spots in a frame each differ from the input currents provided to the laser so that the laser outputs the light beams which define light spots in another frame, by the same percentage amount.

The duration of time over which the "p" frames are projected may be between 10-50 ms. The duration of time over which the "p" frames are projected may be between 20-33 ms. The duration of time over which the "p" frames are projected may be between 1 ns-1 s.

Preferably the "p" frames define an image when they are superposed.

The method may comprise the steps of forming each of the light spots in each of the "p" frames by, for each light spot, (a) consecutively providing the laser with n different input currents so that the laser consecutively outputs "n" different light beams which define "n" secondary light spots; (b) superposing the "n" secondary light spots to define the light spot, wherein "n" is an integer number greater than one.

According to a further aspect of the present invention there is provided a method of projecting a pixel, comprising the steps of (a) determining the speed of oscillation of a MEMS mirror over its full amplitude of oscillation;

(b) determining the time between the instant a laser receives an input current and the instant when a light spot is defined on a surface, wherein the light spot is defined by a light beam which output from the laser in response to the input current;

(c) using the speed and time calculated in steps (a) and (b) respectively, determine the time available to project each of the pixels of an image;

(d) identifying the pixel which is to be projected;

(e) identifying the time available to project the pixel identified in step (d) using the time which were determined in step (c).

(f) dividing the time available to project the pixel identified in step (d) by the time determined in step (b) to obtain a reference value;

(g) taking n to be less than or equal to the reference value, carrying out the steps of (i) consecutively providing the laser with "n" different input currents so that the laser consecutively outputs n different light beams, wherein each one of the "n" different light beams defines a secondary light spot on the surface, wherein "n" is an integer value greater than one; and (ii) superposing the secondary light spots to form a single primary light spot, wherein the single primary light spot defines said pixel.

Preferably step (g) will be performed by taking n to be equal to the reference value.

The method of projecting a pixel may comprises repeating steps (a)-(g) a plurality of times so that a plurality of pixels are projected. Preferably the plurality of pixels will cumulatively define an image. Preferably, the step of repeating steps (a)-(g) a plurality of times will be performed in a duration of time which is between 1 ns-1 s. The step of repeating steps (a)-(g) a plurality of times will be performed in a duration of time which is between 10 ms-50 ms. The step of repeating steps (a)-(g) a plurality of times will be performed in a duration of time which is between 20 ms-33 ms.

Any of the methods mentioned above may comprise the step of selecting areas of an image where the method is to be performed. For example the method of projecting a pixel may comprise the step of selecting which pixels, from the pixels which define the whole image, to perform the steps (a)-(g) for. Thus the method would be performed for selected pixels in an image, not for all the pixels in the image. It will be understood that selecting pixels in the context of the present invention refers to selecting the portions of the light which is output from the laser within the projection device which define the selected pixels before they are projected. as each of pixel (in raster scanning) can have a different time within the image (because of the MEMS mirrors variation in speed over its oscillation), then the light modulation speed can be easier in some parts of the image (typically on the side of the image) and more difficult in the middle of the image. In practice, this is due to speed limitations in the laser. For example the method may selectively be applied to "green" pixels were speckle is more visible with the eye, and less on the other colours, and vice-versa.

BRIEF DESCRIPTION OF THE DRAWINGS

The invention will be better understood with the aid of the description of embodiments of the invention which are given by way of example only, and illustrated by the figures, in which:

FIGS. 2a(i) and 2a(ii) illustrate the step (a) of the method shown in the flow chart of FIG. 1; and FIG. 2b(i) illustrate the input currents which are provided to the laser in FIGS. 2a(i) and 2a(ii); and 2b(ii) illustrates the corresponding optical output from the laser; FIG. 2c illustrates the step (b) of the method shown in the flow chart of FIG. 1;

DETAILED DESCRIPTION OF POSSIBLE EMBODIMENTS OF THE INVENTION

Figure 1:
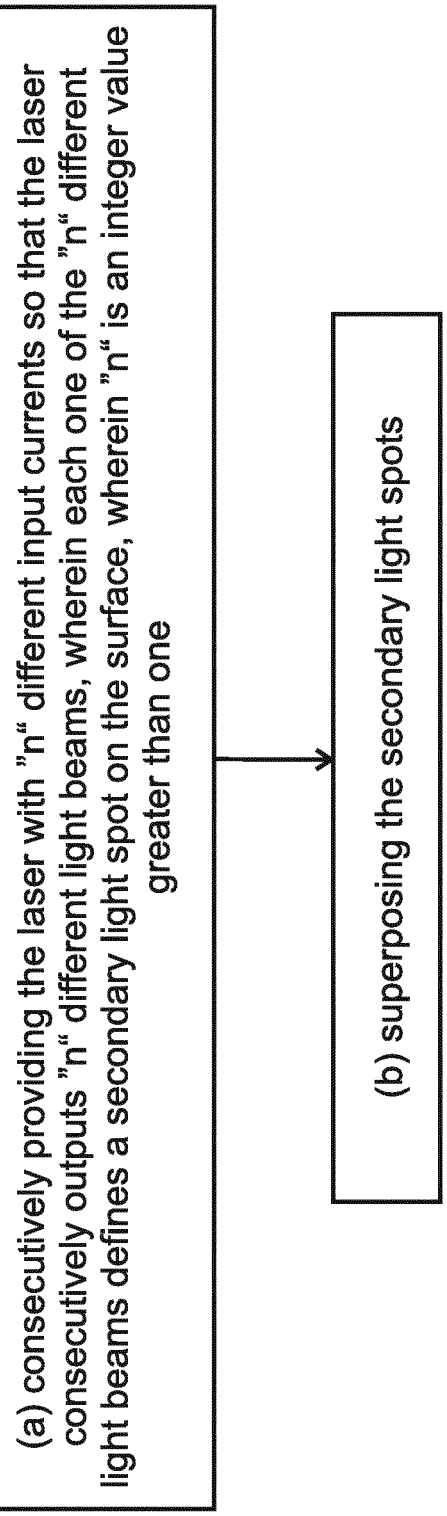
FIG. 1 is a flow chart indicating the steps involved in a method of reducing speckle, according to the present invention.

FIG. 1 is a flow chart indicating the steps involved in a method of reducing speckle, according to the present invention. The exemplary method illustrated in FIG. 1 is a method of reducing speckle in a primary light spot which is projected onto a surface by a projection device which comprises a laser. In the present application a primary light spot is a light spot which is defined when two or more light spots fully, or partially, overlay one another. In this application, each of the light spots which fully, or partially, overlay one another to define a primary light spot are referred to as secondary light spots.

The method illustrated in FIG. 1 comprises the steps of, consecutively providing the laser with n different input currents so that the laser consecutively outputs n different light beams, wherein each one of the n different light beams defines a secondary light spot on the surface, wherein n is an integer value greater than one (step (a)); wherein preferably, each of the n different input currents are higher than the threshold current of the laser. Then, superposing the secondary light spots (step (b)).

FIGS. 2a (i) and (ii) illustrate an example whereby n is equal to "2" (although it should be understood that n could have any integer value greater than "1"). In FIG. 2a(i) a laser 200 is provided with a first input current so that the laser 200 outputs a first light beam 201 which defines a first secondary light spot 202 on a surface 203; in FIG. 2a(ii) the same laser 200 is provided with a second input current so that the laser 200 outputs a second light beam 204 which defines a second secondary light spot 205 on the surface 203. In this example each of the first and second light beams 201,204 are used to define a single secondary light spot each, on the surface 203 so that the first and second light beams 201,204 define first and second secondary light spots 202,205 respectively on the surface 203.

In this example the size of each of the first and second secondary light spots 202,205 defined on the surface 203 are equal.

FIG. 2b(i) illustrates the first input current 207 and second input current 208 which are input to the laser 200 shown in FIGS. 2a (i) and (ii). It is clear from the figure that the amplitude of the first input current 207 is different to the amplitude of the second input current 208. Furthermore the amplitude of each of the first and second input currents is higher than the threshold current (6) of the laser 200.

The first input current 207 is input to the laser 200 for a time period t1 and the second input current 208 is input to the laser 200 for a time period t2. In this example the total duration of time the first and secondary light spots 202,205 are defined on the surface 203 is between 10 ms-50 ms. By determining the time from the instant the laser 200 receives an input current to the time a secondary light spot is defined on the surface 203, one can determine the periods t1,t2 over which the first and second input currents 207,208 should be provided to the laser 200. For example, if the total duration of time the first and secondary light spots are defined on the surface is to be 10 ms and it has been determined that the time from the instant the laser 200 receives an input current to the time a secondary light spot is define on the surface is 2 ms, then one can determine the period t1 over which the first input current 207 should be provided to the laser 200 is 4 ms and the period t2 over which the second input current 208 should be provided to the laser 200 is 4 ms. It will be understood that in a variation of the embodiment the total duration of time the first and secondary light spots are defined on the surface may alternatively be between 1 ns-1 s, 1 ns-10 ms, or 20 ms-33 m. It will also be understood that the periods t1 and t2 do not necessarily need to be equal in duration.

FIG. 2b(ii) illustrates the optical output power from the laser 200 corresponding to when the first and second input currents 207,208 are input to the laser 200. Because the first and second input currents 207,208 differ, the respective first and second light beams 201,204 and thus the respective first and second light spots 202,205 will each have different speckle patterns.

The integration time of a human eye is typically less than 50 ms; as mentioned in this example the first and secondary light spots are defined on the surface for between 10 ms-50 ms; accordingly from the perspective of a human eye, both the first and second secondary light spots 202,205 will appear simultaneously on the surface 203. As illustrated in FIG. 2c the first and second secondary light spots 202,205 are superposed to define a single primary light spot 209 on the surface 203. In the context of the present invention "superposed" means that the secondary light spots which are defined by the n different light beams which are output from the laser, appear to a human eye 206, to overlay one another; this is achieved, for example, by ensuring that the secondary light spots which are defined by the n different light beams which are output from the laser are defined on the surface for period of between 10 ms-50 ms i.e. less than or equal to the integration time of the human eye 206. In this example superposing the first and second secondary light spots 202, 205 involves directly overlaying the second secondary light spot 205 on the first secondary light spot 202, so that the first and second secondary light spots 202,205 are aligned and overlapped on the surface 203.

Since the first and second secondary light spots 202,205 have different speckle patterns and are superposed, the different speckle patterns of the first and second secondary light spots 202,205 cause a reduction in speckle in the single primary light spot 209 which results when the first and second secondary light spots 202,205 are superposed. This is because the speckle in the first and second secondary light spots 202,205 is averaged by supposition of the secondary light spots 202,205; in other words the areas of low speckle in the first light spot 202 will cancel areas of high speckle in the second light spot 205, and vice versa, when the secondary light spots 202,205 are superposed; this results in a reduction in speckle in the single primary light spot 209.

The above-mentioned steps may be repeated a plurality of times so that a plurality of primary light spots 209 are consecutively defined on the surface 203. Each primary light spot 209 may define a pixel of an image so that cumulatively the plurality of primary light spots 209 define an image on the surface 203. Although typically the method of the present invention is used when projecting an image using a projection device, it will be understood that the method is not limited to such use.

Preferably if each primary light spot 209 is used to form pixels of an image, then between each primary light spot the differences between the "n" currents which are input to each laser are constant. For example if the difference between the a first input current and second input current which are input to the laser for the first pixel differ by +20% in amplitude, then the first input current and second input current which are input to the laser for the rest of the pixels should also differ by +20% in amplitude.

In one embodiment the first and second secondary light spots 202,205 are defined and superposed on the surface 203 to define a first pixel in the image, before moving on to define and superpose another first and second secondary light spots 202,205 on the surface 203 to define the next pixel in the image etc. In this manner each pixel of the image is consecutively defined on the surface 203. In this case it is preferable that the total time to define all of the pixels of the image on the surface 203 is between 10 ms-50 ms; this will ensure that all of the pixels of the images will appear to a human eye to be simultaneously defined on the surface 203.

In another embodiment all of the first secondary light spots 202 for all of the pixels in the image are first defined on the surface 203, and after all the first secondary light spots 202 for all of the pixels in the image have been defined on the surface 203 only then are all the second secondary light spots 205 for all of the pixels in the image defined on the surface 203. All of the first secondary light spots 202 for all of the pixels in the image together define a first frame, and all of the second secondary spots for all of the pixels in the image together define a second frame. The first and second frame are then superposed; more specifically, each of the second secondary light spots 205 in the second frame is superposed on a corresponding first secondary light spots 202 in the first frame to define primary light spots 209. In this example each primary light spot 209 defines a pixel of an image. It is preferable that the total time that the first frame is defined on the surface 203 plus the total time that the second frame is defined on the surface 203 is between 10 ms-50 ms; this will ensure that all of the pixels of the image will appear to a human eye to be simultaneously defined on the surface 203. Accordingly, according to a further embodiment of the present invention, there is provided a method comprising the steps of: projecting p frames, each of which comprise a plurality of secondary light spots, each of the plurality of secondary light spots being defined by a light beam which is output from the laser; and then superposing the p frames, wherein p is an integer number greater than one. The input currents provided to the laser so that the laser outputs the light beams which define corresponding secondary light spots in the p frames are different, wherein corresponding secondary light spots are those secondary light spots which superpose each other when the p frames are superposed; for example, assuming p is equal to "2"; in order to project the first secondary light spot 202 in the first of the two frames the laser 200 is provided with a first input current 207. Likewise, in order to project each of the first secondary light spots 202 in the first of the two frames the laser 200 is provided with first input currents 207. After all the first secondary light spots 202 of the first frame have been projected onto the surface 203 the second frame may then be projected onto the surface 203. In order to project the first secondary light spot 205 in the second of the two frames the laser 200 is provided with a second input current 208 which is has a different amplitude to the first input current 207 which was provided to the laser 200 in order to project the corresponding first secondary light spot 202 in the first frame. Likewise for each of the secondary light spots 205 in the second of the two frames the laser 200 is provided with a second input current 208 which has a different amplitude to the first input current 207 which was provided to the laser 207 in order to project the corresponding secondary light spot 202 in the first frame. The first and second frames are then superposed; more specifically, the first secondary light spot 205 of the second frame will be superposed on the corresponding first secondary light spot 202 of the first frame to define a first primary light spot 209. Likewise the other secondary light spots 205 of the second frame will be superposed on their corresponding secondary light spot 202 of the first frame to each define primary light spots 209. Most preferably the primary light spots 209 which are formed when the first and second frames are superposed will define pixels of an image; thus superposing the first and second frames will result in an image being defined on the surface 209. Since the first and second input currents 207, 208 provided to the laser 200 are different the first secondary light spot 202 of the first frame and the first secondary light spot 205 of the second frame have different speckle patterns. Likewise all the other secondary light spots 202 of the first frame will have a different speckle patterns to the corresponding secondary light spots 205 of the second frame.

Thus superposing the first and second frame, i.e. superimposing all the light spots 202 of the first frame on all the light spots 205 of the second frame will result in a reduction in speckle.

Preferably the difference between input currents 207 provided to the laser 200 so that the laser 200 outputs the light beams which define light spots 202 in the first frame differ from the input currents 208 provided to the laser 200 so that the laser outputs the light beams which define light spots 205 in second frame, by the same percentage amount. So for example, if the first input current 207 which is provided to the laser 200 to project the first secondary light spot 202 in the first of the two frames is 5 amps and the second input current 208 which is provided to the laser 200 to project the first secondary light spot 205 in the second of the two frames is 6 amps then the percentage difference (in this case the percentage increase) is +20%; accordingly the second input currents 208 which are provided to the laser 200 in order to project each of the other secondary light spots 205 of the second frame should be equal to: the first input current 207 which was used to project the corresponding secondary light spot of the first frame, increased by 20%.

Preferably the duration of time over which the p frames are projected onto the surface is 10-50 ms. Again, as was the case for the other examples, this will ensure that that the frames will appear to the human eye to be projected simultaneously onto the surface.

In a preferable embodiment each of the secondary light spots 202,205 in each for the p frames are also formed by providing different input currents to the laser 200. Taking the first secondary light spot 202 of the first frame for example; to define the first secondary light spot 202 on the surface 203 the laser 203 may be consecutively providing the laser with n different input currents so that the laser consecutively outputs n different light beams which define n secondary light spots; the n different light spots are then superposed to define the first secondary light spot 202 of the first frame; wherein n is an integer number greater than one. Each of the secondary light spots 202,205 of each of the first and second frames may be formed in this manner.

Figure 3:
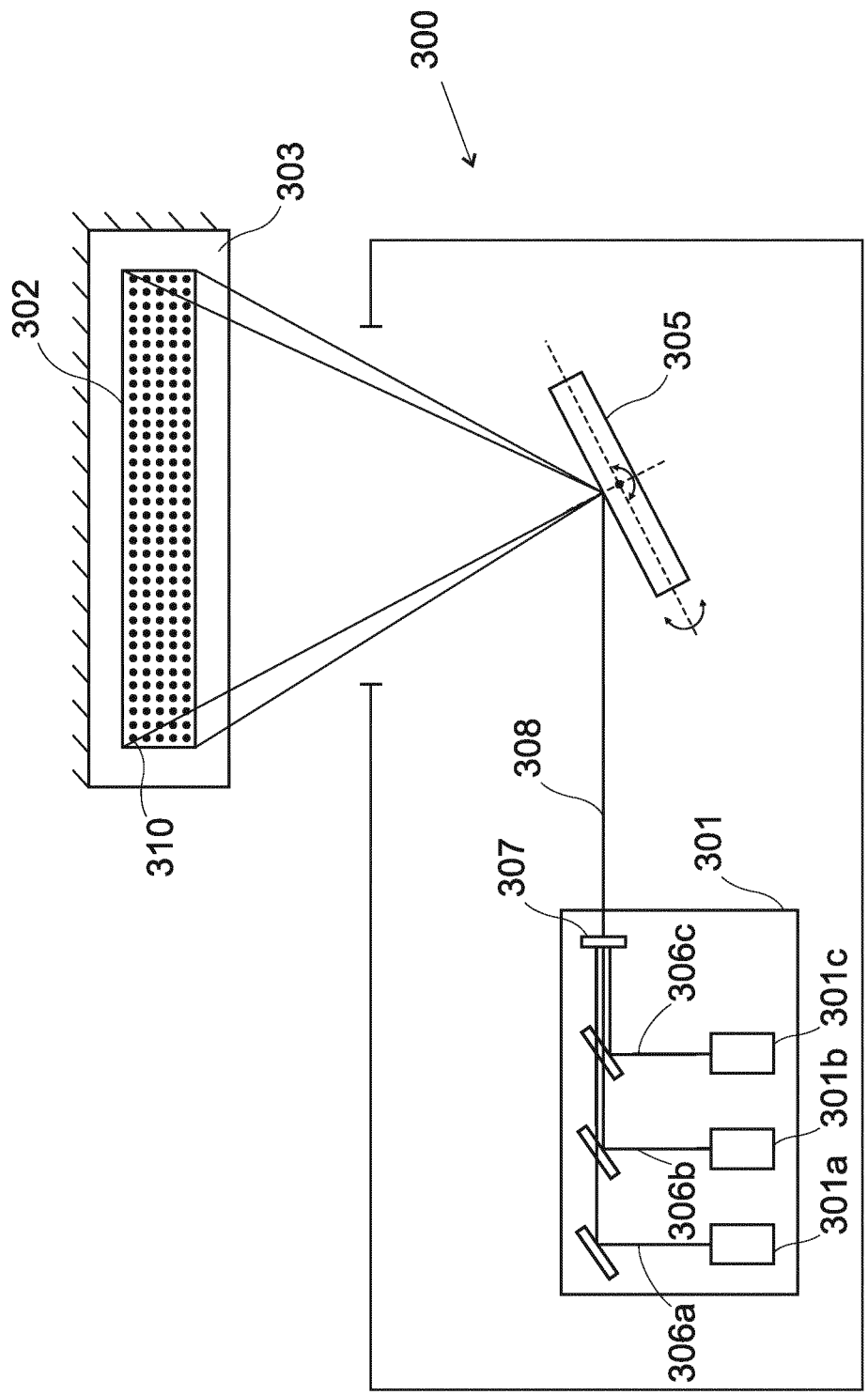
FIG. 3 is perspective view of a projection device which can be used to perform the method of the present invention.

FIG. 3 illustrates a projection device 300 in which the steps of the above-mentioned methods can be performed. The projection device 300 is shown in FIG. 3 to be projecting an image 302 onto a surface 303.

The projection device 300 comprises a light source 301 and a MEMS micro-mirror device 305 which is arranged in optical communication with the light source 301.

The light source 301 comprises three lasers, a red laser, green laser and a blue laser 301a-c, which can generate red, green and blue beams 306a-c respectively. The red, green and blue beams 306a-c are combined using a beam combiner 307 to define a light beam 308. The proportion of red, green and blue light in the light beam 308 depends on the colour of the pixel to be projected on the surface 303. The light beam 308 passes from the beam combiner 307 to the MEMS micro-mirror device 305. The light beam 308 is then reflected by the MEMS micro-mirror device 305 towards the surface 303 where the light beam 308 defines a light spot 310 on the surface 303. In the present invention each pixel of a projected image is defined by a two or more light spots 310 which are superposed on the surface 303; wherein each of the two or more light spots 310 are each defined by light beams 308 which have being output from the beam combiner 307 after each of the lasers 301a-c have been provided with at least two different input currents. It should be understood that each of the two or more light spots 310 may each be defined by light beams 308 which have being output from the beam combiner 307 after one or two of the lasers 301a-c have been provided with at least two different input currents. The MEMS micro-mirror device 305 oscillates so that pixels of the image are consecutively projected onto the surface 303. The duration of time it takes to project all of the pixels on the surface 303 is preferably less than the integration time of the human eye so that it appears to the human eye that all pixels of the image are being simultaneously projected onto the surface 303.

Figure 4A:
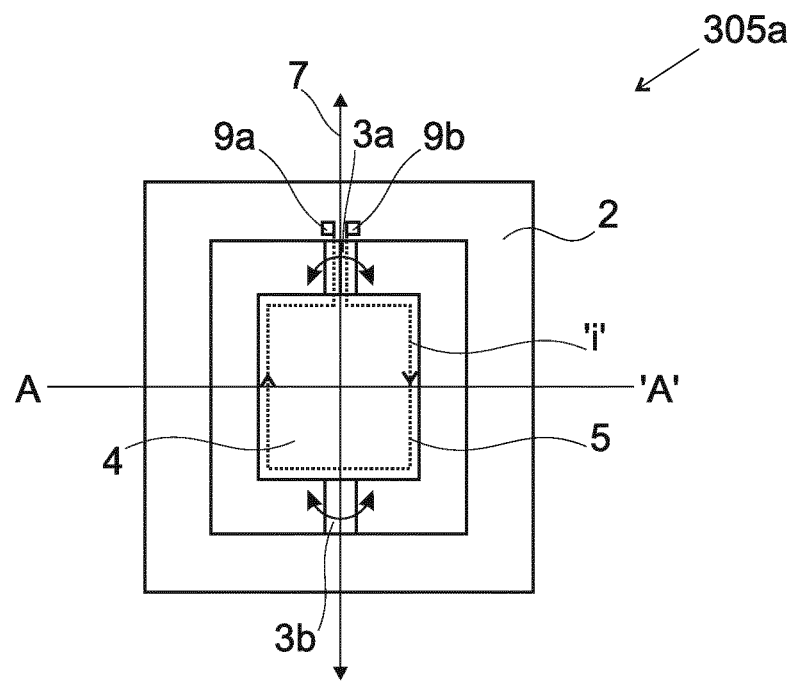
FIGS. 4a and 4b illustrate a possible configuration for the MEMS micro-mirror device used in the projection device of FIG. 3.
Figure 4B:
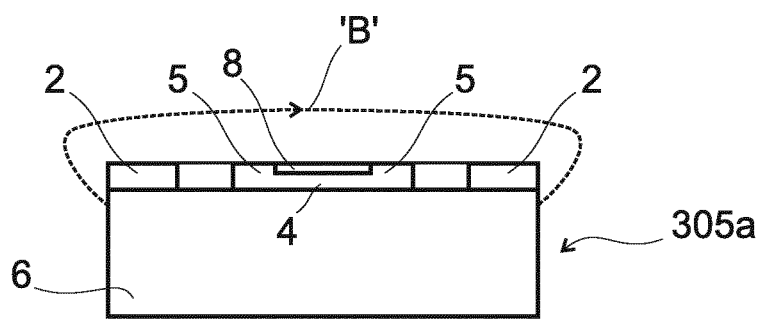

The MEMS micro-mirror device 305 may have a number of different configurations, as it known in the art. FIGS. 4a and 4b show an example one possible configuration for the MEMS micro-mirror device 305. FIG. 4a provides a top view of the MEMS micro-mirror device 305a and FIG. 4b shows a cross sectional view of the MEMS micro-mirror device 305a, taken along A-A' of FIG. 4a.

The MEMS micro-mirror device 305a comprises a first support frame 2. A first torsional arm 3a and second torsional arm 3b connect a moveable part 4 to the support frame 2. The moveable part 4 comprises a micro-mirror 8 mounted thereon. In this embodiment the support frame 2 is fixed (i.e. immovable). The first and second torsional arms 3a,b define a first oscillation axis 7 for the moveable part 4. A first actuation coil 5 is supported on, and connected to, the moveable part 4. The first actuation coil 5 is arranged to extend, from a first electrical contact 9a which is located on the support frame 2, along the first torsional arm 3a, around the perimeter of the moveable part 4 and back along the first torsional arm 3a to a second electrical contact 9b which is located on the support frame 2.

The first support frame 2, first and second torsional arms 3a,b, the moveable part 4, the micro-mirror 8, and first actuation coil 5, define collectively a MEMS die 10. As shown in FIG. 4b the MEMS die 10 is mounted on, and fixed to (using glue for example), a magnet 6 such the first actuation coil 5 is submerged in the magnetic field 'B' generated by the magnet 6. Preferably the MEMS die 10 is fixed at the first support frame 2 to the magnet 6; this is usually achieved by providing glue between the first support frame 2 of the MEMS die 10 and the magnet 6.

During use, an electric current 'I' is passed through the first actuation coil 5. As the first actuation coil 5 is submerged in the magnetic field 'B' created by the magnet 6, the actuation coil 5 will provide a Laplace force which will be applied to the moveable part 4. The Laplace force will cause the moveable part 4, and thus the MEMS micro-mirror 8, to oscillate about its first oscillation axis 7.

As the MEMS micro-mirror 8 oscillates it will scan the light beam which it receives from the beam combiner across a surface. Typically, to enable two dimensional scanning (i.e. along the vertical and horizontal) a projection device will comprise two MEMS micro-mirror devices 305a which are arranged in the projection device to be in optical communication. One of the MEMS micro-mirror devices 305a will be arranged to scan light along the vertical and the other will be arranged to scan light along the horizontal. Typically this is achieved by arranging the two MEMS micro-mirror devices 305a so that their oscillation axes are orthogonal and so that they are in optical communication.

Figure 5:
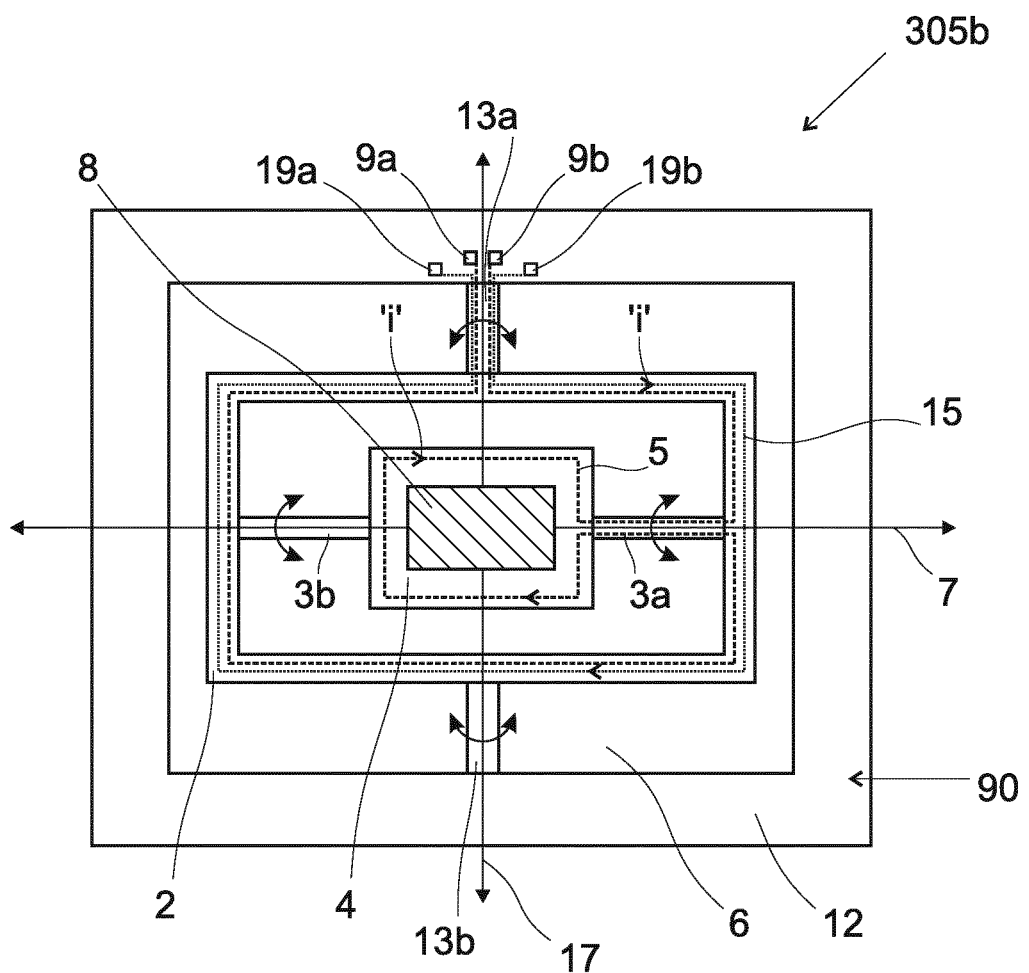
FIG. 5 illustrates another possible configuration for the MEMS micro-mirror device used in the projection device of FIG. 3.

Alternatively, instead of providing two MEMS micro-mirror devices 305a in the projection device, the MEMS micro-mirror device 305 could be configured to enable oscillation of the moveable part 4 about two orthogonal axes; this will enable the MEMS micro-mirror 8 of a single MEMS micro-mirror devices 305 to scan light in two dimensions (typically along the horizontal and vertical). FIG. 5 shows a MEMS micro-mirror device 305b which is configured to enable oscillation of the moveable part 4 about two orthogonal axes. It should be noted that the projection device shown in FIG. 3 has a MEMS micro mirror device 305 configured as shown in FIG. 5.

The MEMS micro-mirror device 305b has many of the same features of the MEMS micro-mirror device 305a shown in FIGS. 4a and 4b; however in the MEMS micro-mirror device 305b the support frame 2 is configured to be moveable; the support frame 2 is configured such that it can oscillate about a second oscillation axis 17, which is orthogonal to the first oscillation axis 7.

The MEMS micro-mirror device 305b further comprises a fixed part 12 (i.e. an immovable part); the support frame 2 is connected to the fixed part 12 via third and fourth torsional arms 13a,b. The third and fourth torsional arms 13a,b, define the second oscillation axis 17. A second actuation coil 15 is connected to the support frame 2. This second actuation coil 15 will also be submerged by the magnetic field 'B' generated by the magnet 6.

A second actuation coil 15 is supported on, and connected to, the support frame 2. The second actuation coil 15 is arranged to extend, from a first electrical contact 19a which is located on the fixed part 12, along the third torsional arm 13a, around the perimeter of the support frame 2 and back along the third torsional arm 13a to a second electrical contact 19b which is located on the fixed part 12. It should be noted that the second actuation coil 15 does not extend along the fourth torsional arm 13b.

Furthermore, in the MEMS micro-mirror device 305b the first and second electrical contacts 9a, 9b for the first actuation coil 5 are located on the fixed part 12 and thus the first actuation coil 5 is arranged to also extend along the support frame 2 and the third and fourth torsional arms in order to electrically connect to the first and second electrical contacts 9a, 9b.

The first support frame 2, first and second torsional arms 3a,b, the moveable part 4, the micro-mirror 8, and first actuation coil 5, the fixed part 12, second actuation coil 15, third and fourth torsional arms 13a,b, define collectively a MEMS die 90. The MEMS die 90 is mounted on, and fixed to (using glue for example), a magnet 6 such the first actuation coil 5 is submerged in the magnetic field 'B' generated by the magnet 6. Preferably the MEMS die 90 is secured at the fixed part 12 to the magnet 6; this is usually achieved by providing glue between the fixed part 12 of the MEMS die 90 and the magnet 6.

During use an electric current 'i' is passed through the first actuation coil 5 which is connected to the moveable part 4. As the first actuation coil 5 is submerged in the magnetic field 'B' created by the magnet 6 the first actuation coil 5 will provide a Laplace force which will be applied to the moveable part 4. The Laplace force will cause the moveable part 4, and thus the micro-mirror 8, to oscillate about the first oscillation axis 7. An electric current 'I' is also passed through the second actuation coil 15 which is connected to the support frame 2. As the second actuation coil 15 is also submerged in the magnetic field 'B' created by the magnet 6, the second actuation coil 15 will provide a Laplace force which will be applied to the support frame 2. The Laplace force which is applied to the support frame 2 by the second actuation coil 15 will cause the support frame 2, and thus the moveable part 4 which is connected to the support frame 2 via the torsional arms 13a,b, to oscillate about the second oscillation axis 17. Accordingly the MEMS micro-mirror 8 will be oscillated about the first and second orthogonal oscillation axes 7,17. If the micro-mirror 8 reflects light as it is oscillating about the first and second orthogonal oscillation axes 7,17 the reflected light will be scanned in two dimensions e.g. horizontal and vertical. This will, for example, enable combined light beams which the micro-mirror 8 receives, to be scanned across the area of a projection screen in, for example, a zig-zag or raster pattern.

Figure 6:
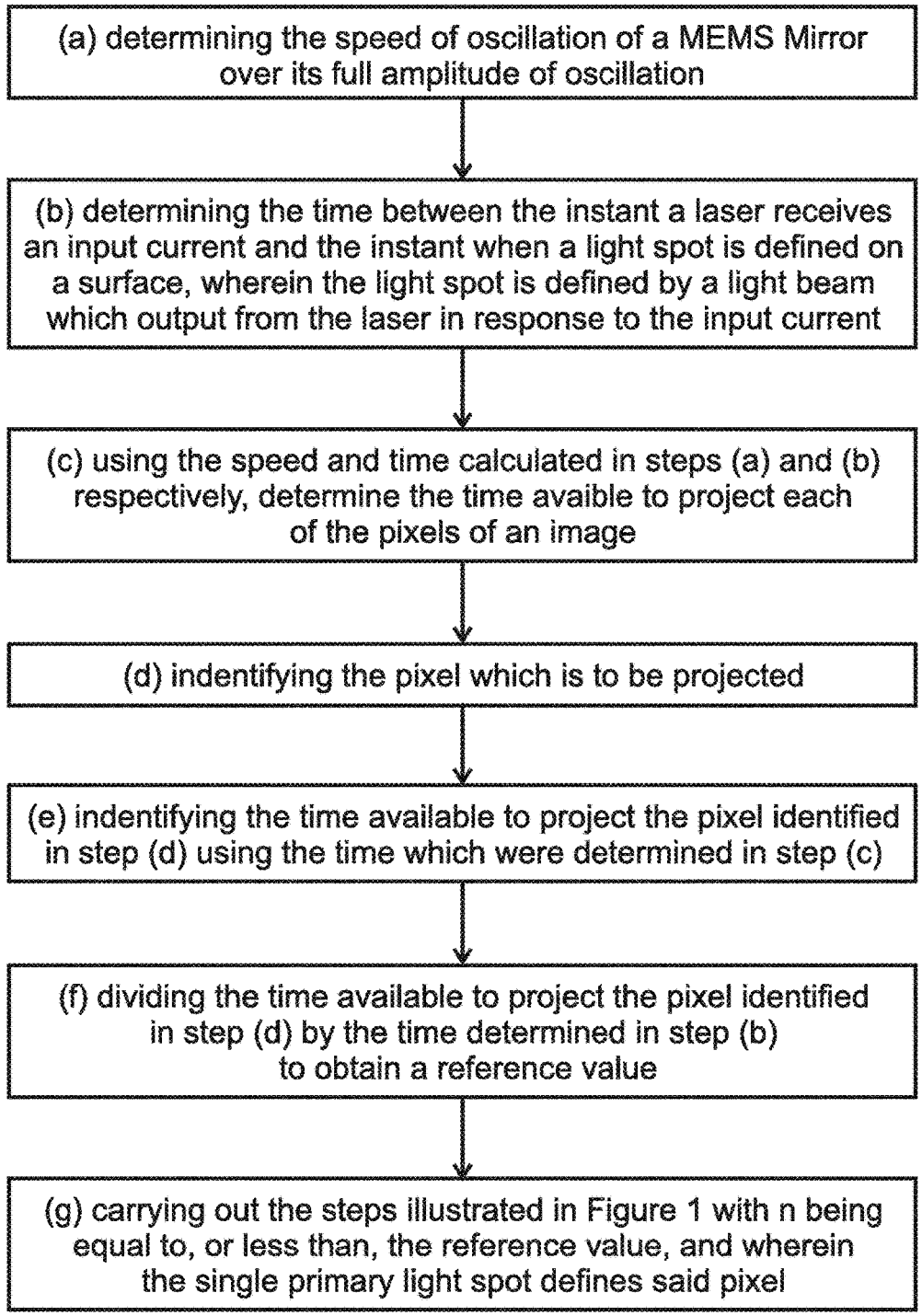
FIG. 6 is a flow chart indicating the steps involved in a method of projecting a pixel, which involve a method of reducing speckle according to an embodiment of the present invention.

FIG. 6 is a flow chart indicating the steps involved in a method of projecting a pixel according to a further aspect of the present invention. The method is performed in a projection device such as the projection device shown in FIG. 3.

The method involves first determining the speed of oscillation of a MEMS mirror 8 over its full amplitude of oscillation; in relation to the projection device 300 shown in FIG. 5 this would be done by determining the speed of oscillation of moveable part 4 about its first and second orthogonal oscillation axes 7,17 (step (a)).

Next, the time between the instant a laser 301a-c receives an input current and the instant when a resulting light spot 310 is defined on the surface 303, is determined (step (b)) (wherein the light spot is defined by a light beam which output from the laser 301a-c in response to the input current).

Using the speed and time calculated in steps (a) and (b) respectively, the time available to project each of the pixels of an image is determined (step (c)). For example, assuming that each pixel of the projected image 302 is to be 0.02 m in size, and at the middle of the MEMS mirror's amplitude of oscillation the MEMS mirror 8 is moving at a speed of 0.01 m/sec and it takes 0.2 seconds between the instant the laser 301ac receives an input current and the instant when a light spot 310 is defined on the surface 303. Then it can be calculated that the amount of time available to project a pixel which is located at the middle of the projected image is 1.8 seconds (i.e. (0.02/0.01)−0.2). This is done for every instant of the over the MEMS mirror's total amplitude of oscillation so that the amount of time available to project each pixel of the image is determined. Since the light beam(s) which define each pixel of the image is reflected by the MEMS mirror 8 to the surface 303, it will be understood that the position of the MEMS mirror 8 (i.e. the position along its amplitude of oscillation) corresponds to the position of the pixel which is to be projected; so if the MEMS mirror 8 is at an end of its amplitude of oscillation then a pixel located at the edge of the image is projected and if the MEMS mirror 8 is in the middle of its amplitude of oscillation then a pixel located at the middle of the image is projected.

Next the pixel which is to be projected is identified (step (d)). This may be done by, for example, sensing when the MEMS mirror is at its maximum angle of oscillation and identifying from the position a corresponding pixel which is stored in a memory buffer, wherein the memory buffer stored the image to be projected; counting the pixel which corresponds to when the MEMS mirror is at its maximum angle of oscillation as the first pixel of the image, and then counting the number of pixels that are being read from the buffer. The pixel which is to be projected may be determined by identifying the position of the MEMS mirror 8; for example if the MEMS mirror 8 is located at its maximum amplitude of oscillation along both axis of oscillations, then it can be identified that a pixel at the corner of the projected image is to be projected.

Using the times which were determined in step (c), the amount of time available to project the pixel identified in step (d) is then identified (step (e)). The amount of time available to project the pixel identified in step (d) is then divided by the time determined in step (b) to obtain a reference value (f).

Finally the steps as illustrated in FIG. 1 are carried out with n being equal to the reference value, and wherein the single primary light spot defines said pixel (step (g)). With the exception of step (c) above, all of the above mentioned steps are repeated a plurality of times so as to project a plurality of pixels which cumulatively define the image.

Figure 7:
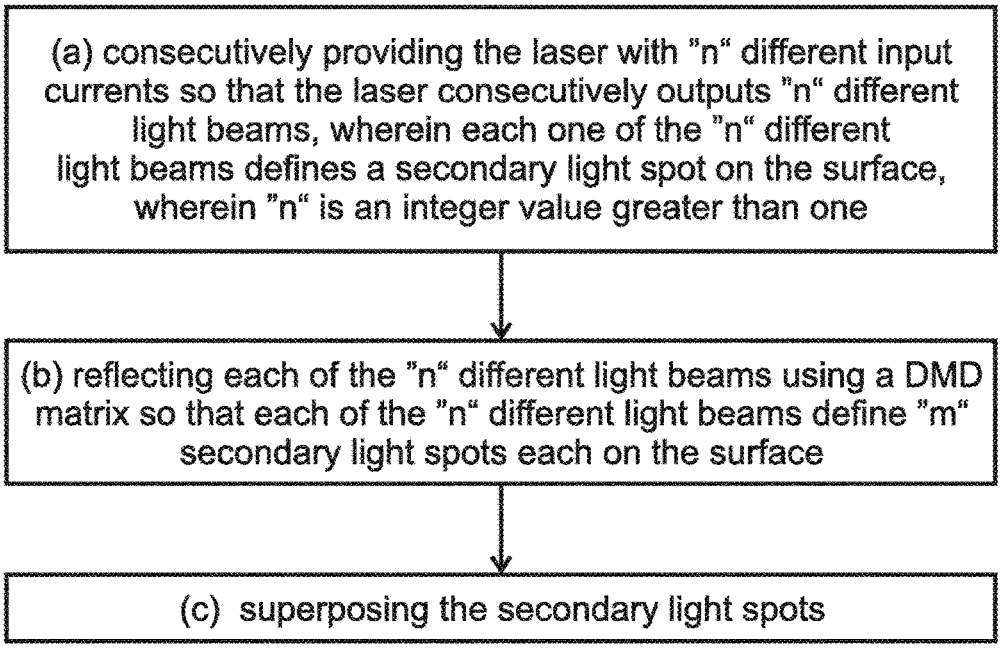
FIG. 7 is a flow chart indicating the steps involved in a method of reducing speckle according to the present invention.

In each of the above-mentioned methods, a plurality of primary light spots may be consecutively defined on a surface. In an alternative embodiment a plurality of primary light spots are simultaneously (instead of consecutively) defined on the surface. FIG. 7 is a flow chart indicating the steps involved in a method of reducing speckle, according to a further embodiment of the present invention. In the method depicted in FIG. 7 a plurality of primary light spots are simultaneously defined on a surface.

The method illustrated in FIG. 7 has many of the same steps as the method illustrated in FIG. 1, however the method illustrated in FIG. 7 further includes the step of reflecting each of the n different light beams using a DMD matrix so that each of the "n" different light beams define an array of "m" secondary light spots each on a surface. Thus, each one of the "n" different light beams is used to define "m" secondary light spots each on the surface. The arrays of "m" secondary light spots from each of the "n" different beams are superposed on the surface to define an array of "m" primary light spots, wherein "m" is an integer number greater than or equal to "2" and "n" is an integer number greater than or equal to "2". Typically each of the "m" primary light spots define a pixel of an image. The method therefore comprises the steps of, consecutively providing the laser with n different input currents so that the laser consecutively outputs "n" different light beams, wherein each one of the "n" different light beams defines a secondary light spot on the surface, wherein "n" is an integer value greater than one (step (a)); and reflecting each of the "n" different light beams using a DMD matrix so that each of the "n" different light beams define an array of "m" secondary light spots each on a projection surface (step (b)); then superposing the "n" arrays of "m" secondary light spots (step (c)).

For example, in order to project an image onto a surface, a laser within a projection device may be provided with a first input current so that the laser outputs a first light beam. Preferable the first input current is higher than the threshold current of the laser. The first light beam is reflected by the DMD matrix to the surface so that the first light beam defines an array of "m" secondary light spots on the surface. "m" is an integer number greater than or equal to "1" and typically is equal to the number of pixels in the image to be projected. Then the laser within a projection device is provided with a second input current, which is preferably different to the first input current and is also higher than the threshold current of the laser, so that the laser outputs a second light beam; the second light beam is reflected by the DMD matrix to the surface so that the second light beam also defines an array of "m" secondary light spots on the surface. The array of "m" secondary light spots defined by the second light beam are superposed on the array of "m" secondary light spots defined by the primary light beam to define pixels of an image on the surface. Preferably the time which the "m" secondary light spots defined by the second light beam are defined on the surface plus the time the "m" secondary light spots defined by the primary light beam are defined on the surface, is between 10 ms-50 ms; this will ensure that all of the pixels of the images will appear to a human eye to be simultaneously defined on the surface.

It will be understood that while in the above example the laser is provided with only a first and second input current so that only a first and second light beam is used, any number of input currents greater than '2' may be provided to the laser, so that any number of "n" arrays of "m" secondary light spots may be superposed to define the pixels of the image.

It will be understood that the DMD matrix may be an array of micro-mirrors, each micro-mirror may represent one or more pixels in the projected image. Each micro-mirror can be individually addressed to be turned digitally in a first or in a second predetermined direction. By switching the tilt angle of the micro-mirrors, the light is either deflected onto the screen or onto a heat sink.

Figure 8:
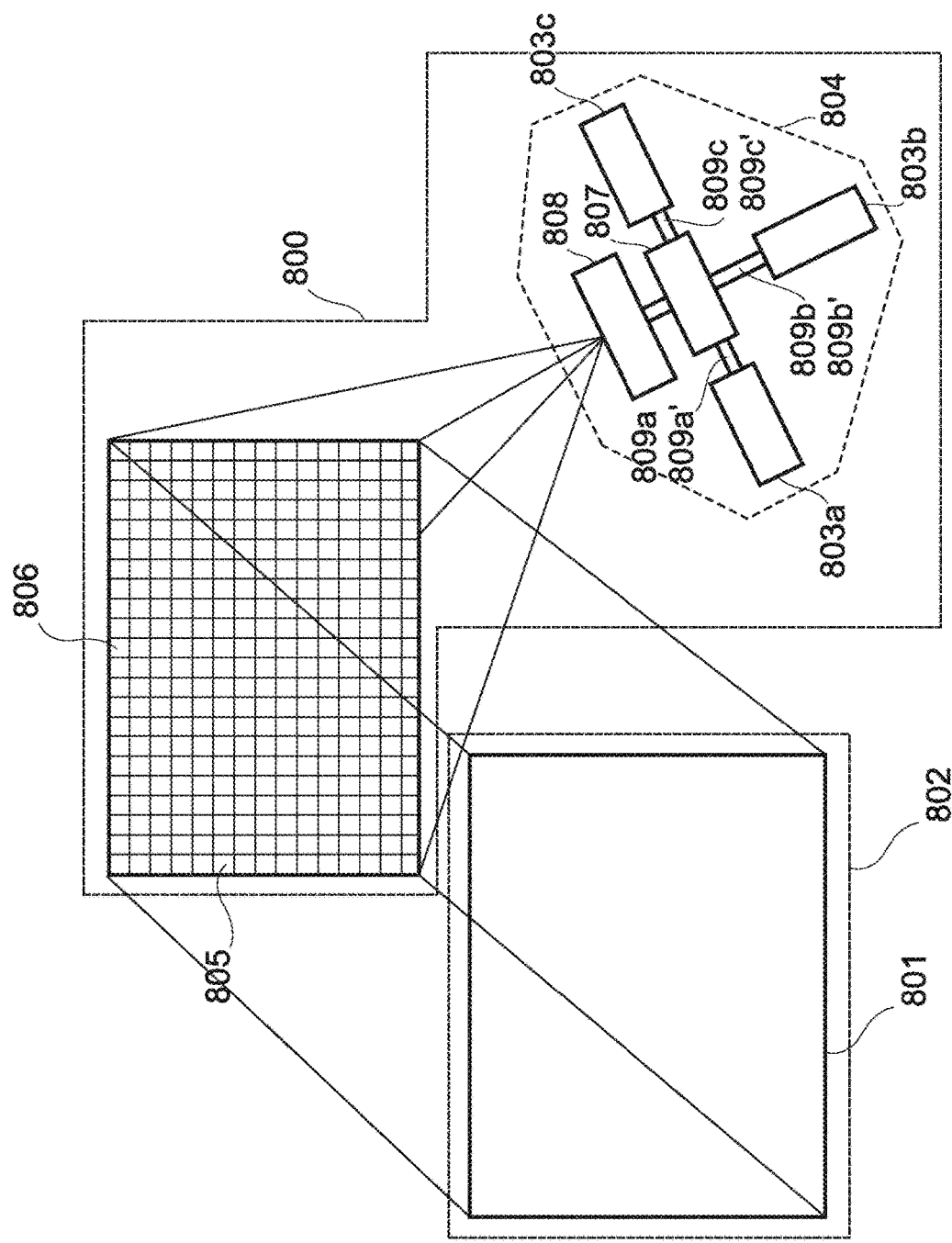
FIG. 8 is perspective view of a projection device which can be used to perform the method illustrated in the flow chart of FIG. 7.

FIG. 8 illustrates a projection device 800 in which the steps of the method depicted in FIG. 7 can be performed.

The projection device in FIG. 8 is shown to be projecting an image 801 onto a surface 802. The projection device 800 comprises a light source 804 which comprises a red, green and blue lasers 803a-c, and a DMD matrix 805 which is arranged in optical communication with the light source 804. In this example the DMD matrix 805 comprises a plurality of micro-mirrors 806; however it will be understood that the DMD matrix 805 could alternatively comprises liquid crystal display or Liquid crystal on Silicon. The light source 804 comprises a beam combiner 807 and a beam expander 808, however these are optional features. The DMD matrix may comprise an array of micro-mirrors, each micro-mirror may represent one or more pixels in the projected image. By switching the tilt angle of the micro-mirrors, the light is either deflected onto the screen or onto a heat sink.

The red, green and blue lasers 803a-c can generate red, green and blue beams respectively. In this particular embodiment it is preferable that the light source 804 is configured the red, green and blue lasers 803a-c respectively generate red, green and blue beams consecutively. Accordingly in the embodiment depicted in FIG. 8 the beam combiner 807 is not used to combine beam but rather is used for alignment purposes; the beam combiner 807 allows consecutive red, green and blue beams to all have the same angle of incidence on the DMD matrix 805. The amount of red, green and blue beams which are generated at the light source 804 depends on the colour of the pixels of the image 801 which are to be projected.

In order to project an image a first input current is provided to the red laser 803a so that the red laser generates a red light beam; the red light beam 809a is reflected to the DMD matrix 805 to define a plurality of red secondary light spots on the surface 802. Likewise a first input current is provided to the green laser 803b so that the green laser generates a green light beam 809b; the green light beam 809b is reflected to the DMD matrix 805 to define a plurality of green secondary light spots on the surface 802 which overlay the red secondary light spots. A first input current is provided to the blue laser 803c so that the blue laser generates a blue light beam 809c; the blue light beam 809c is reflected by the DMD matrix 805 to define a plurality of blue secondary light spots on the surface which overlay the red and green secondary light spots. In accordance with the present invention, a second input current is provided to the red laser 803a so that the red laser 803a generates a second red light beam 809a'; the second red light beam 809a' is reflected by the DMD matrix 805 to define a plurality of red secondary light spots on the surface 802. Likewise a second input current is provided to the green laser 803b so that the green laser 803b generates a second green light beam 809b'; the second green light beam 809b' is reflected by the DMD matrix to define a plurality of green secondary light spots on the surface 802 which overlay the red secondary light spots. A second input current is provided to the blue laser 803c so that the blue laser 803c generates a second blue light beam 809'; the second blue light beam 809c' is reflected by the DMD matrix 805 to define a plurality of blue secondary light spots on the surface 802 which overlay the red and green secondary light spots. All of the secondary light spots, from the first and second red, green and blue light beams 809a, 809a',809b,809b',809c,809c' are superposed on the surface 802 so that an image 801 is defined on the surface 802. In this example each pixel of the image is defined by two red secondary light spots, two green secondary light spots and two blue secondary light spots, however it will be understood that each pixel may be defined by an integer number of secondary lights spots. Preferably the time to project all of the secondary light spots on the surface 802 is between 10 ms-50 ms so all of the pixels of the image will be projected onto the surface 802 in within a time which is less than (or equal to) 50 ms; accordingly it will appear to a human eye that all the pixels are projected simultaneously onto the surface 802.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A device comprising:
a laser light source to project a light spot, the light spot comprising a plurality of secondary light spots;
a laser driver operably coupled to the laser light source, the laser driver to provide n input currents to cause the laser light source to output n light beams over a first period, where n is an integer greater than one, each one of the n light beams to define a one of the plurality of secondary light spots, the first period based, in part, on a delay time defined by a difference between a first instant the laser light receives an input current and a second instant the light spot is defined on a projection surface and a time available to project a plurality of pixels of an image; and
a mirror to reflect the n light beams to superimpose the secondary light spots onto the projection surface to project the light spot to define a pixel of the image.

2. The device of claim 1, wherein each of the n input currents are higher than a threshold current of the laser light source.

3. The device of claim 1, wherein each of the n input currents have a different amplitude.

4. The device of claim 1, the mirror to reflect the n light beams to directly overlay each of the plurality of secondary light spots onto another one of the plurality of secondary light spots to superimpose secondary spot lights.

5. The device of claim 1, the mirror to reflect the n light beams to project n secondary light spots onto the projection surface and to superimpose the n secondary light spots to define the light spot.

6. The device of claim 5, wherein the light spot defines a pixel of an image to be projected on the projection surface.

7. The device of claim 6, the laser driver to provide the n input currents to define the n secondary light spots on the projection surface a total duration of time between 1 nanosecond and 1 second.

8. The device of claim 1, the mirror to reflect the n light beams to project m secondary spot lights for each of the n light beams and to superpose the m secondary spot lights to define m light spots, where m is an integer number greater than or equal to two and the light spot is a one of the m light spots.

9. The device of claim 1, comprising a display panel the display panel to cooperate with the mirror to reflect the n light beams to define m secondary spot lights for each of the n light beams, wherein the display panel comprises a dot matrix display (DMD) component, thin-film-transistor (TFT) component, or liquid crystal on silicon (LCOS) component.

10. The device of claim 9, wherein each of the m light spots define a pixel of an image to be projected on the projection surface.

11. A method, comprising:
providing n input currents to a laser light source over a first period;
outputting n light beams based on the n input currents, where n is an integer greater than one, each one of the n light beams to define a one of a plurality of secondary light spots, the first period based, in part, on a delay time defined by a difference between a first instant the laser light receives an input current and a second instant a one of the n light beams is defined on a projection surface and a time available to project a plurality of pixels of an image; and
superimposing the secondary light spots onto the projection surface to project a light spot to define a pixel of the image.

12. The method of claim 11, wherein each of the n input currents are higher than a threshold current of the laser light source.

13. The method of claim 11, wherein each of the n input currents have a different amplitude.

14. The method of claim 11, comprising reflecting the n light beams to directly overlay each of the plurality of secondary light spots onto another one of the plurality of secondary light spots to superimpose secondary spot lights.

15. The method of claim 11, comprising reflecting the n light beams to project n secondary light spots onto the projection surface and to superimpose the n secondary light spots to define the light spot.

16. The method of claim 15, wherein the light spot defines a pixel of an image to be projected on the projection surface.

17. The method of claim 16, comprising providing the n input currents to define the n secondary light spots on the projection surface a total duration of time between 1 nanosecond and 1 second.

18. The method of claim 11, comprising:
reflecting the n light beams to project m secondary spot lights for each of the n light beams; and
superposing the m secondary spot lights to define m light spots, where m is an integer number greater than or equal to two and the light spot is a one of the m light spots.

19. The method of claim 11, comprising reflecting the n light beams to define m secondary spot lights for each of the n light beams via a display panel, wherein the display panel comprises a dot matrix display (DMD) component, thin-film-transistor (TFT) component, or liquid crystal on silicon (LCOS) component.

20. The method of claim 19, wherein each of the m light spots define a pixel of an image to be projected on the projection surface.

21. A method comprising:
determining a speed of oscillation of a microelectromechanical system (MEMS) mirror over a full amplitude of oscillation of the MEMS mirror;
determining a delay time between a first instant a laser receives an input current and a second instant a light spot is defined on a surface, wherein the light spot is defined by a light beam output from the laser in response to the input current;
determining a time available to project a plurality of pixels of an image based on the speed and the delay time;
identifying a one of the plurality of pixels to project;
providing n input currents to a laser light source, wherein n is determined based on the time available and the delay time;
outputting n light beams based on the n input currents, where n is an integer greater than one, each one of the n light beams to define a one of a plurality of secondary light spots; and
superimposing the secondary light spots onto a projection surface to project a light spot, wherein the light spot corresponds to the identified pixel.

22. The method of claim 21, comprising reflecting the n light beams to directly overlay each of the plurality of secondary light spots onto another one of the plurality of secondary light spots to superimpose secondary spot lights.

23. The method of claim 21, comprising reflecting the n light beams to project n secondary light spots onto the projection surface and to superimpose the n secondary light spots to define the light spot.

24. The method of claim 23, comprising providing the n input currents to define the n secondary light spots on the projection surface a total duration of time between 1 nanosecond and 1 second.

* * * * *